US008850789B2

(12) United States Patent
Evulet et al.

(10) Patent No.: US 8,850,789 B2
(45) Date of Patent: Oct. 7, 2014

(54) SYSTEMS AND METHODS FOR POWER GENERATION WITH EXHAUST GAS RECIRCULATION

(75) Inventors: Andrei Tristan Evulet, Clifton Park, NY (US); Ahmed Mostafa ElKady, Niskayuna, NY (US); Michael John Bowman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1823 days.

(21) Appl. No.: 11/960,824

(22) Filed: Dec. 20, 2007

(65) Prior Publication Data

US 2008/0309087 A1 Dec. 18, 2008

Related U.S. Application Data

(60) Provisional application No. 60/943,734, filed on Jun. 13, 2007.

(51) Int. Cl.
| | |
|---|---|
| *F02C 6/00* | (2006.01) |
| *F02G 1/00* | (2006.01) |
| *F02G 3/00* | (2006.01) |
| *F02C 7/08* | (2006.01) |
| *F02C 3/34* | (2006.01) |
| *F02C 7/10* | (2006.01) |

(52) U.S. Cl.
CPC . *F02C 3/34* (2013.01); *Y02E 20/16* (2013.01); *F02C 7/08* (2013.01); *F02C 7/10* (2013.01)
USPC .............. 60/39.182; 60/39.5; 60/39.52

(58) Field of Classification Search
USPC ................. 60/39.5, 39.52, 39.182
See application file for complete search history.

(56) References Cited

U.S. PATENT DOCUMENTS

| | | | | |
|---|---|---|---|---|
| 4,426,842 A * | 1/1984 | Collet | ......................... | 60/39.511 |
| 5,412,936 A * | 5/1995 | Lee et al. | .......................... | 60/801 |
| 5,832,712 A * | 11/1998 | Rønning et al. | ................. | 60/783 |
| 6,598,402 B2 * | 7/2003 | Kataoka et al. | .................. | 60/775 |
| 6,655,150 B1 * | 12/2003 | Åsen et al. | ....................... | 60/772 |
| 7,354,029 B1 * | 4/2008 | Rutstein | .......................... | 261/76 |
| 2003/0221409 A1* | 12/2003 | McGowan | ................... | 60/39.17 |
| 2004/0065088 A1* | 4/2004 | Viteri et al. | ...................... | 60/772 |
| 2004/0244381 A1 | 12/2004 | Becker | | |
| 2005/0028529 A1 | 2/2005 | Bartlett et al. | | |
| 2005/0235649 A1* | 10/2005 | Baer et al. | ......................... | 60/772 |
| 2007/0028622 A1* | 2/2007 | Steyer et al. | ..................... | 60/772 |
| 2007/0107415 A1* | 5/2007 | Althaus | ........................... | 60/281 |

* cited by examiner

Primary Examiner — Craig Kim
(74) Attorney, Agent, or Firm — Francis T. Coppa

(57) ABSTRACT

A power generation system includes a gas turbine system. The turbine system includes a combustion chamber configured to combust a fuel stream a compressor configured to receive a feed oxidant stream and supply a compressed oxidant to the combustion chamber and an expander configured to receive a discharge from the combustion chamber and generate an exhaust comprising carbon dioxide and electrical energy. The system further includes a retrofittable exhaust gas recirculation system including a splitter configured to split the exhaust into a first split stream and a second split stream, a heat recovery steam generator configured to receive the first split stream and generate a cooled first split stream and a purification system configured to receive the first cooled split stream and the second split stream and generate a recycle stream, wherein the recycle stream is mixed with the fresh oxidant to generate the feed oxidant stream.

27 Claims, 8 Drawing Sheets

SYSTEMS AND METHODS FOR POWER GENERATION WITH EXHAUST GAS RECIRCULATION

This application claims priority to and the benefit of provisional U.S. Patent Application No. 60/943,734, entitled "LOW NOX HIGH $CO_2$ COMBUSTOR, GAS TURBINE AND CYCLE FOR LOW EMISSIONS POWER GENERATION", filed on Jun. 13, 2007, which is hereby incorporated by reference in its entirety.

BACKGROUND

The invention relates generally to power generation and the efficient recovery of carbon dioxide. More particularly, the invention relates to the integration of gas-turbine exhaust recirculation with reduced NOx emission.

Power generation systems that combust fuels containing carbon (e.g., fossil fuels) produce carbon dioxide ($CO_2$) as a byproduct, because in the combustion, carbon is converted to $CO_2$. Typically air is used as an oxidant for the fuel combustion forming NOx. Removal or recovery of the carbon dioxide ($CO_2$) from power generation systems, such as from the exhaust of a gas turbine, is generally not economical due to low $CO_2$ content and low (ambient) pressure of the exhaust. Therefore, unfortunately, the exhaust containing the $CO_2$ is typically released to the atmosphere, and does not get sequestered into oceans, mines, oil wells, geological saline reservoirs, and so on. There is a need for a technique that provides for economical recovery of $CO_2$ discharged from power generation systems (e.g., gas turbines) that rely on carbon-containing fuels and also reduce NOx formation.

BRIEF DESCRIPTION

In one aspect, a power generation system includes a gas turbine system. The turbine system includes a combustion chamber configured to combust a fuel stream a compressor configured to receive a feed oxidant stream and supply a compressed oxidant to the combustion chamber and an expander configured to receive a discharge from the combustion chamber and generate an exhaust comprising carbon dioxide and electrical energy. The system further includes a retrofittable exhaust gas recirculation system including a splitter configured to split the exhaust into a first split stream and a second split stream, a heat recovery steam generator configured to receive the first split stream and generate a cooled first split stream and a purification system configured to receive the first cooled split stream and the second split stream and generate a recycle stream, wherein the recycle stream is mixed with the fresh oxidant to generate the feed oxidant stream.

In another aspect, a power generation system includes a gas turbine system including a combustion chamber configured to combust a fuel stream, a compressor configured to receive a feed oxidant stream and supply a compressed oxidant to the combustion chamber and an expander configured to receive a discharge from the combustion chamber and generate an exhaust comprising carbon dioxide and electrical energy. The system further includes an exhaust gas recirculation unit including a splitter configured to split the exhaust into a first split stream and a second split stream, a heat recovery steam generator configured to receive the first split stream and generate a cooled first split stream, a blower to boost pressure in the cooled first split stream and a purification system configured to receive the first cooled split stream and the second split stream and generate a recycle stream, wherein the recycle stream is mixed with the fresh oxidant to generate the feed oxidant stream; and. The exhaust gas recirculation unit further includes a first control valve and a second control valve wherein the first control valve is configured to release a portion of the cooled first exhaust and the second control valve is configured release a portion of the recycle stream.

A method of generating power with reduced NOx emmission includes compressing a feed oxidant and generating a compressed oxidant in a compressor, combusting a fuel stream and the compressed oxidant in a combustion chamber and generating a discharge and expanding the discharge from the combustion chamber and generating an exhaust comprising carbon dioxide and electrical energy. The method further includes splitting the exhaust into a first split stream and a second split stream, recovering heat from the first split stream and generating a cooled first split stream and increasing the pressure of the cooled first split stream. The method also includes remixing the cooled first split stream and the second split stream and generating a mixed exhaust, purifying the mixed exhaust and generating a recycle stream and mixing the recycle stream with fresh oxidant and generating the feed oxidant.

In yet another aspect, a method of generating power includes compressing a feed oxidant and generating a compressed oxidant in a compressor, combusting a fuel stream and the compressed oxidant in a combustion chamber and generating a discharge and expanding the discharge from the combustion chamber and generating an exhaust comprising carbon dioxide and electrical energy. The method further includes splitting the exhaust into a first split stream and a second split stream using a coanda ejector, recovering heat from the first split stream and generating a cooled first split stream, increasing the pressure of the cooled first split stream and remixing the cooled first split stream and the second split stream and generating a mixed exhaust. The method also includes purifying the mixed exhaust and generating a recycle stream mixing the recycle stream with fresh oxidant and generating the feed oxidant; and releasing a portion of the cooled first exhaust through a first control valve and releasing a portion of the recycle stream through a second control valve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides for one or more exemplary gas turbine systems operating in a power generation system to generate power with low NOx and $CO_2$ emissions. A portion of the exhaust from the gas turbine is re-circulated into the inlet of the turbine, which portion of the exhaust is blended with fresh oxidant such as air before being introduced to the combustion chamber of the turbine system. As a result the blended oxidant used for combustion has lower oxygen content when compared to a conventional oxidant and results in low NOx emission in the discharge from the combustion chamber. Additionally the carbon dioxide generated in the combustion process is concentrated as a portion of the exhaust gas is re-circulated back to the turbine system which re-circulation enhances the $CO_2$ separation processes downstream. The present techniques also provide a purification process to purify the exhaust gas before being re-circulated back into the turbine system. This purification process provides clean exhaust gas to be re-circulated back into the turbine system thereby preventing any damage to the internal components of the turbine system.

Figure 1:
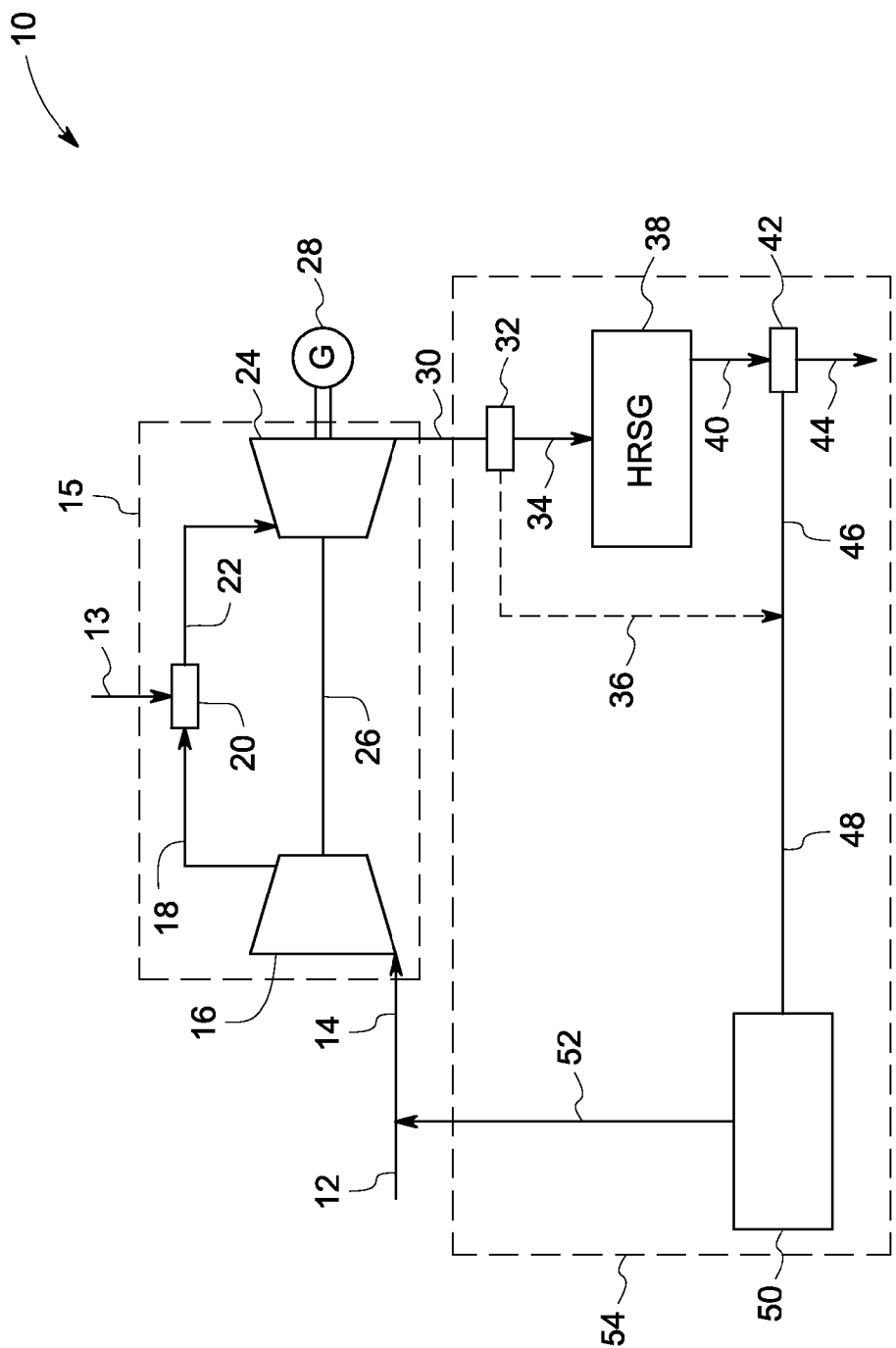
FIG. 1 is a flow diagram of an exemplary integrated power generation system with exhaust gas recirculation system in accordance with embodiments of the present technique.

Turning now to the drawings, FIG. 1 illustrates an exemplary power generation system 10 having a gas turbine system 15. The gas turbine system 15 includes a combustion chamber 20 configured to combust a fuel stream 13 and a compressor 16 configured to receive a feed oxidant stream 14 and supply a compressed oxidant 18 to the combustion chamber 20. The turbine system 15 further includes an expander 24 configured to receive a discharge 22 from the combustion chamber 20 and generate an exhaust 30 comprising carbon dioxide and electrical energy through a generator 28. The compressor 16 and the expander 24 are typically coupled through a common shaft 26. The power generation system 10 further includes a retrofitable exhaust gas recirculation system 54 comprising a splitter 32 configured to split the exhaust 30 into a first split stream 34 and a second split stream 36. The exhaust gas re-circulation system 54 also includes a heat recovery steam generator (HRSG) 38 (which is part of a combined cycle plant, not shown) configured to receive the first split stream 34 and generate a cooled first split stream 40. A purification system 50 is configured to receive the first cooled split stream 46 and the second split stream 36 and generate a recycle stream 52. In operation, the recycle stream 52 is mixed with fresh oxidant 12 to generate the feed oxidant stream 14.

It is understood that the compressed oxidant 18 from the compressor 16 may comprise any suitable gas containing oxygen, such as for example, air, oxygen rich air and oxygen-depleted air. The combustion process in the combustion chamber 20 generates the discharge stream 22.

As illustrated, the discharge stream 22 from the combustion chamber 20 may be introduced into the expander 24. As indicated, the power generation system 10 includes a generator 28 attached to the turbine system 15. The thermodynamic expansion of the hot discharge stream 22 fed into the expander 24 produces power to drive the gas turbine system 15, which, in turn, generates electricity through the generator 28. In this embodiment, electricity from the generator 28 may be converted to an appropriate form and is provided to a distribution power supply network grid (not shown). The expanded exhaust 30 from the expander 24 may be fed into the splitter 32. In one embodiment, the splitter 32 is a coanda ejector enhancing the splitting of the exhaust stream into the first and the second split stream. The HRSG 38 is used for recovering the heat content of the first split stream 34 to generate steam. The temperature of the exhaust stream 30 is at about 700° F. to about 1100° F. and the cooled first split stream 40 is at a temperature of about 60° F. to about 200° F.

In one embodiment, the exhaust gas re-circulation system 54 further includes a first control valve 42 configured to release a portion of the cooled first exhaust 44. In one embodiment the stream 44 is released to atmosphere and in another embodiment, the stream 44 is sent to a $CO_2$ separation unit to separate $CO_2$ before being released to atmosphere. The remaining portion of the cooled first split stream 46 is mixed with the second split stream 36 to generate a mixed exhaust stream 48 and the mixed exhaust stream 48 is sent to the purification unit 50. The purification unit 50 is configured to remove contaminants such as moisture, particulates and acid gases from the mixed exhaust stream 48 before recycling it back to the inlet of the compressor 16 as a recycle stream 52. Impurities and moisture content in an exhaust gas prevent utilization of a simple re-circulation loop to accomplish the $CO_2$ concentration. Direct re-circulation of a portion of an exhaust from a turbine system may result in turbine failing and accelerated wear of internal components due to the presence of certain impurities such as particles and acid gases in an exhaust stream. Therefore the presence of the purification unit 50 enhances the removal of contaminants such as water vapor, acid gases, aldehydes and hydrocarbons and reduces chances of accelerated corrosion and fouling in the internal components of the gas turbine system 15. As shown in FIG. 1, the recycle stream 52 is mixed with fresh oxidant 12 to generate the feed oxidant 14 for the compressor 16. This recycling operation generally increases the $CO_2$ concentration in the compressed oxidant stream 18 and subsequently in the exhaust 30.

The fuel stream 13 may include any suitable hydrocarbon gas or liquid, such as natural gas, methane, naphtha, butane, propane, syngas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the discharge stream 22 from the combustion chamber 20 may include water, carbon dioxide ($CO_2$), carbon monoxide (CO), nitrogen ($N_2$) Nitrogen oxides (NOx), unburned fuel, and other compounds.

The exhaust gas recirculation system 54 may be used as a retrofittable unit for retrofitting into any existing gas turbines to achieve higher concentration of $CO_2$ in the working fluid in the turbine system and also to lower NOx emissions. Reduced NOx emission from the combustion chamber 20 is achieved due to decrease in oxygen content in the compressed oxidant 18 as fresh air 12 is mixed with the recycle stream 52 comprising depleted oxygen levels. In some embodiments, the oxygen level in the compressed oxidant stream 18 is as low as about 13% to about 15% and the oxygen level in the discharge 22 from the combustion chamber 20 may be as low as less than 2% by volume. This lower level of oxygen results in generation of NOx levels down to below 10 ppm and $CO_2$ levels up to 10% by volume in the discharge 22 from the combustion chamber 20.

Exhaust gas re-circulation (EGR) is effectively used in the present techniques to increase $CO_2$ level in the exhaust and to reduce NOx at the same time. NOx treatment in any combustion process is typically achieved by selective catalytic reduction (SCR) and/or using a pre-mixed combustion process. The present techniques provide slight modifications to the gas turbines including an EGR system that may be applied to existing systems as a retrofit and minor modification of the combustion nozzles to allow a more flexible operation to achieve low NOx formation and higher $CO_2$ level in the exhaust. In one embodiment, as stated earlier, the portion of the cooled exhaust 44 is directed to the $CO_2$ separation unit (not shown). Any $CO_2$ separation technology may be involved (for example amine treatment, PSA, membrane, etc.). After separating the $CO_2$ rich stream may be directed to a $CO_2$ conditioning system, including a $CO_2$ compression system. The increase in $CO_2$ concentration in the exhaust stream from the turbine system enhances the efficiency of the $CO_2$ separation process.

Figure 2:
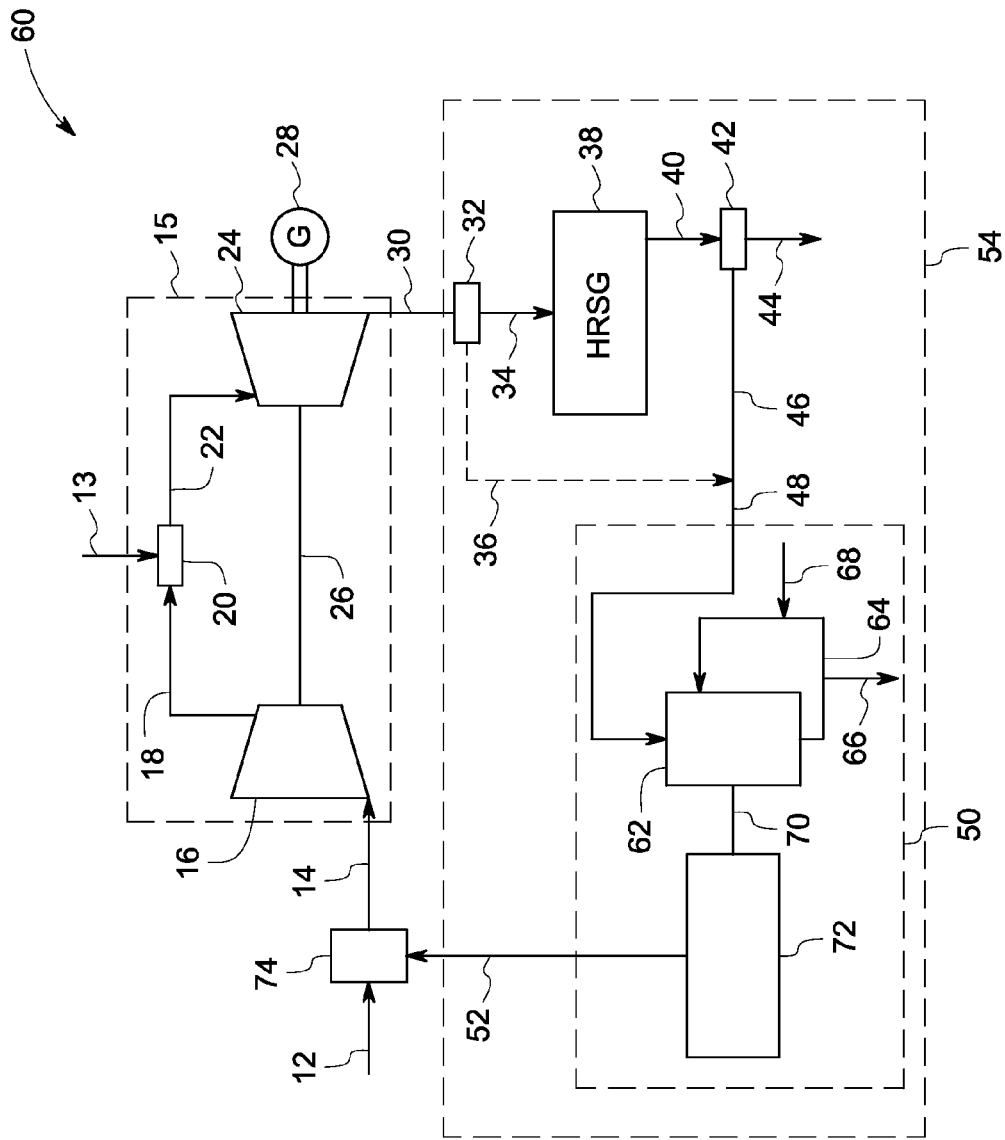
FIG. 2 is a flow diagram of another exemplary power generation system exhaust gas recirculation system in accordance with embodiments of the present technique.

FIG. 2 illustrates another exemplary power generation system 60 using the exhaust gas re-circulation system 54. The purification system 50 as shown in FIG. 2 includes a water quench 62 and a de-mister 72. In operation, atomized water 64 is introduced into the water quench 62. In some embodiments a chiller or heat exchanger (not shown) is provided along with the quench 62 to reduce the temperature of the mixed exhaust stream 48 to about 60° F. to about 120° F. The atomized water in conjunction with the drop in temperature causes the condensables in the mixed stream 48 to enter the quench water recirculation loop 62. A portion of water 66 is removed from the quench water recirculation loop 62 and is replaced with fresh water 68. The exit stream 70 from the quench 62 is fed into the de-mister 72, which de-mister 72 removes the remaining droplets from the exit stream and generates the recycle stream 52 to be recycled back to the inlet of the compressor 16. In one embodiment, the recycle stream 52 is mixed with fresh oxidant 12 such as air in a mixing chamber 74 to generate the feed oxidant 14 for the compressor 16.

Figure 3:
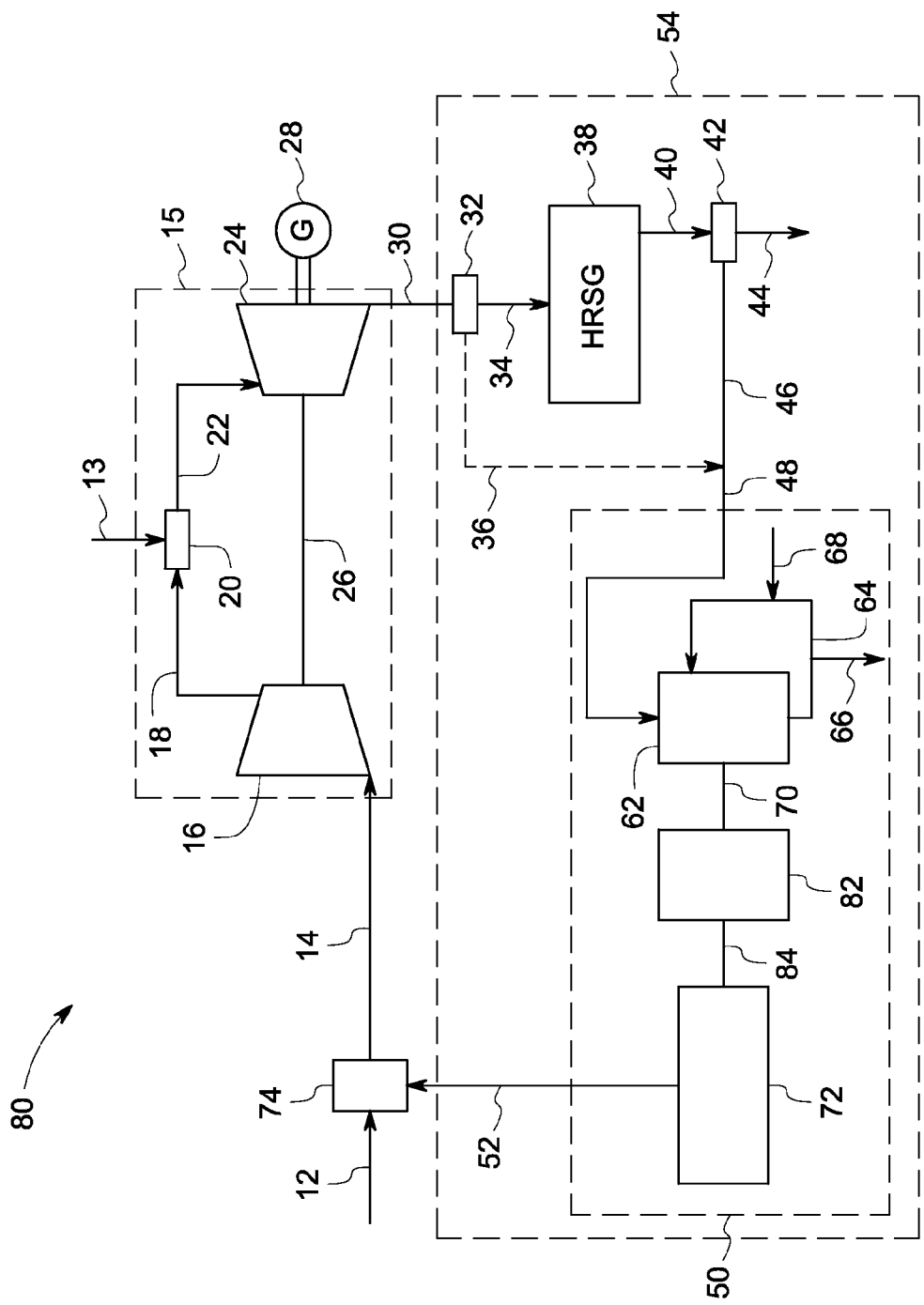
FIG. 3 is a flow diagram of yet another exemplary power generation system exhaust gas recirculation system in accordance with embodiments of the present technique.

FIG. 3 illustrates yet another power generation system 80, wherein the purification unit 50 includes a quench unit 62, a heat exchanger 82 and a de-mister 72. In operation, the atomized water 64 in the quench unit reduces the temperature of the mixed exhaust 48 to the saturation point. The exit stream 84 leaving the heat exchanger 82 is sent to the de-mister 72 before being sent to the compressor 16 as the recycle stream 52.

Figure 4:
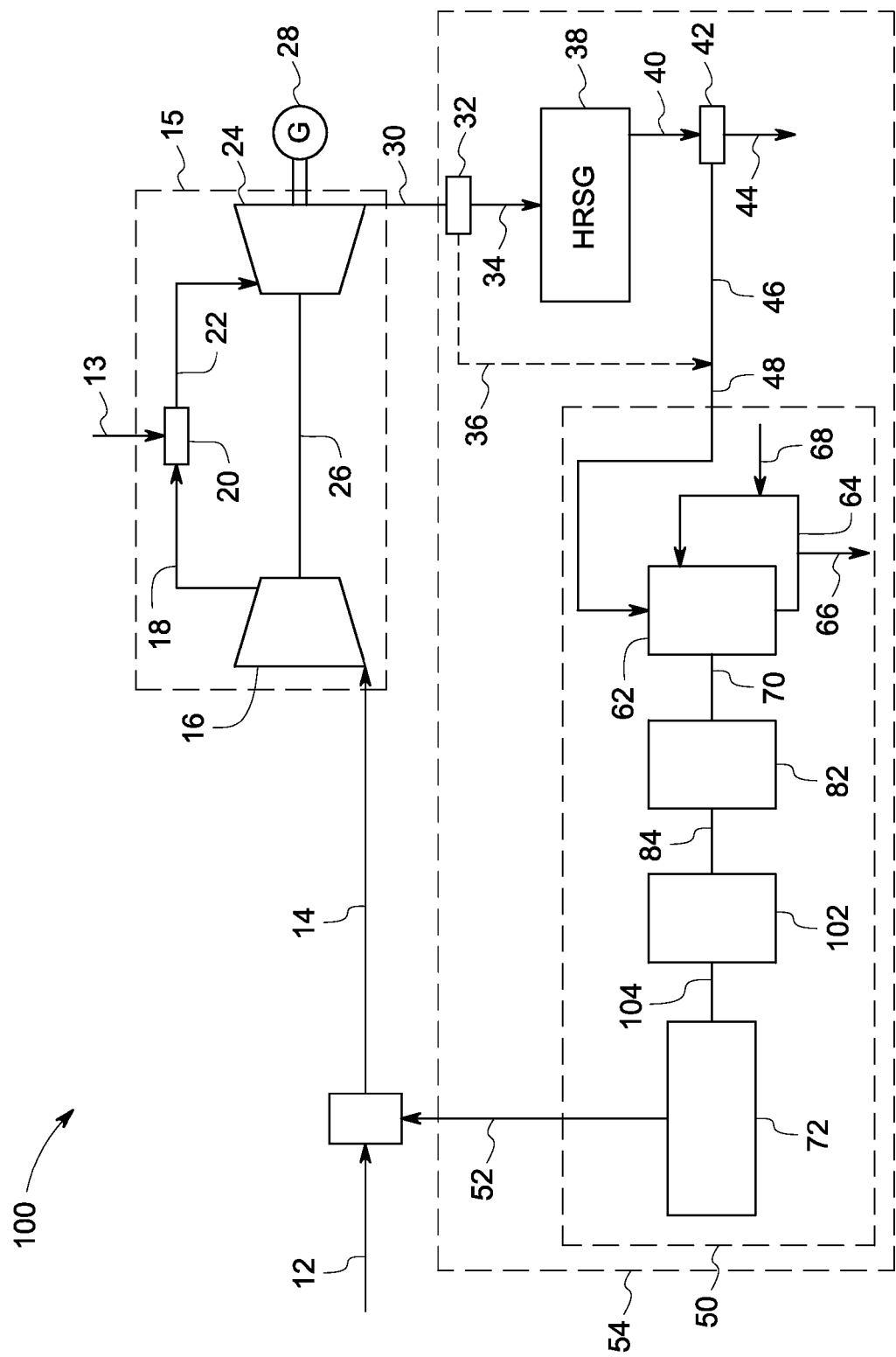
FIG. 4 is a flow diagram of yet another exemplary power generation system exhaust gas recirculation system in accordance with embodiments of the present technique.

FIG. 4 illustrates yet another power generation system 100, wherein the purification unit 50 includes a quench unit 62, a heat exchanger 82, a wet electrostatic precipitator (Wet ESP) 102 and a de-mister 72. In operation, the atomized water 64 in the quench unit 62 comprises adsorption material to adsorb any undesired species in the mixed exhaust 48. This adsorption process in the quench unit 62 may add particulates in the exit stream 70 leaving the quench unit 62. The wet ESP 102 is configured to remove the particulates from the stream 70. The exit stream 84 leaving the heat exchanger 82 is sent to the wet ESP 102 before being sent to the de-mister 72. The exit stream from the de-mister 72 is the recycle stream 52 that is sent back to the compressor 16. The materials added to the quench unit to adsorb un-desired species depends on the characteristics of the fuel burned in the turbine system 15 and the level of purification required.

Figure 5:
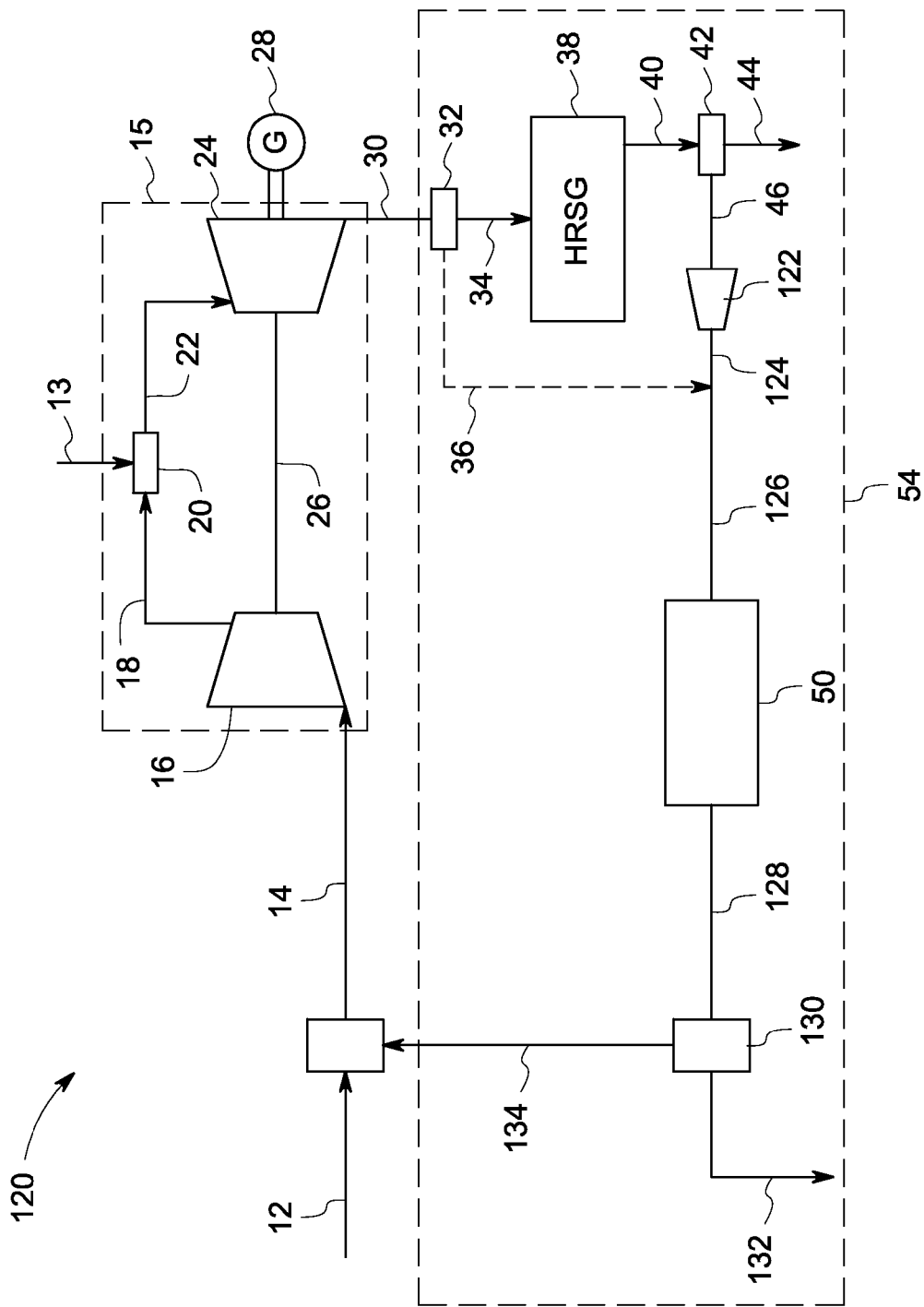
FIG. 5 is a flow diagram of another exemplary power generation system exhaust gas recirculation system in accordance with embodiments of the present technique.

FIG. 5 illustrates yet another exemplary power generation system 120. The power generation system 120 includes a blower 122 provided to boost the pressure of the cooled first split stream 46 before it is mixed with the second split stream 36. As shown in FIG. 5, the exit stream from the purification unit 50 is sent to a second control valve 130 to release a portion 132 to an emergency stack. In operation, the availability of a second control valve 130 in the exhaust gas re-circulation system 54 provides another degree of flexibility to control the optimum performance of the entire power generation system 120. In situations wherein the purification unit 50 or any other unit in the exhaust gas re-circulation system 54 malfunctions, the second control valve 130 may release all or a large portion of the exit stream 128 from the purification unit 50 and as a result save any damage to the internal components of the gas turbine system 15. In some embodiments, by using the first and the second control valves 42 and 130, up to 50% of the exhaust 30 is recycled back into the compressor 16 as the recycle stream 52.

The exhaust gas re-circulation systems as described in FIGS. 1-5 utilize an integrated control system. The control system integrates the operation of each unit in the exhaust gas re-circulation system to achieve an optimum performance of the power generation systems. In one embodiment, the control system may be driven by a continuous monitoring system (not shown in Figures) installed at the inlet of the mixing chamber 74. The continuous monitoring system measures the constituents in the recycle stream 52 and provides feedback to the control system. Based on this feedback, the control system may adjust parameters including but not limiting to quench recirculation rate, sorbent injection rate in quench unit, and gas temperatures at several location in the exhaust gas re-circulation system 54. The control system may also integrate the operating parameters of the gas turbine system 15 and ambient conditions into the overall logic. The control system may optimize gas temperature at key locations of the power generation systems to ensure most efficient cooling.

Figure 6:
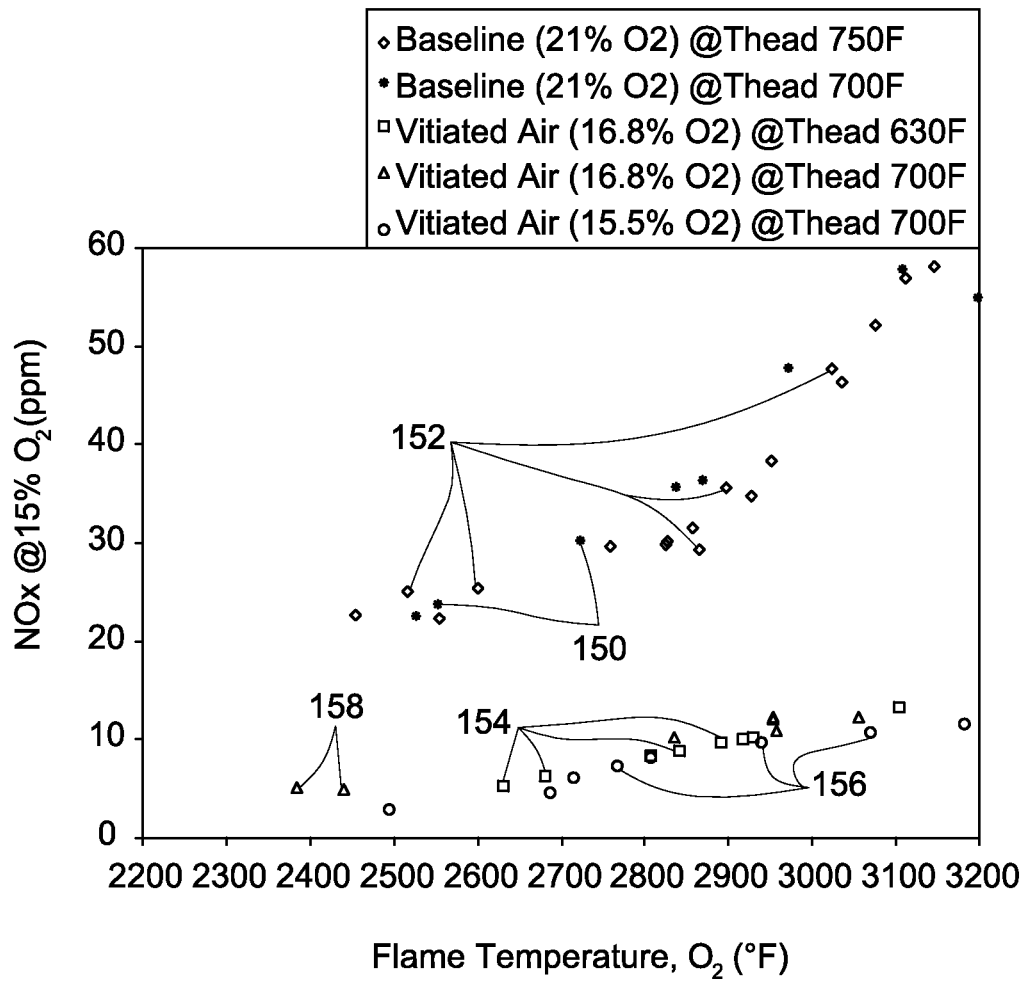
FIG. 6 illustrates a NOx formation trend at different levels of oxygen in the Turbine working fluid.

FIG. 6 shows the NOx level in the exhaust gas 30 as a function of the flame temperature in the combustion chamber 20 at different levels of oxygen present in the compressed oxidant 18. The NOx formation using 21% oxygen (represented by points 150 and 152) is in the range of 20-60 ppm as the flame temperature goes up from 2400 to 3200° F. In contrast, the NOx formation using 16.8% oxygen (represented by points 154, 156 and 158) is in the range of 2-14 ppm as the flame temperature goes up from 2400 to 3200° F. The results clearly show a decline in NOx formation by using oxidant having less oxygen content, which decline is a result of using the exhaust gas re-circulation systems described above.

Figure 7:
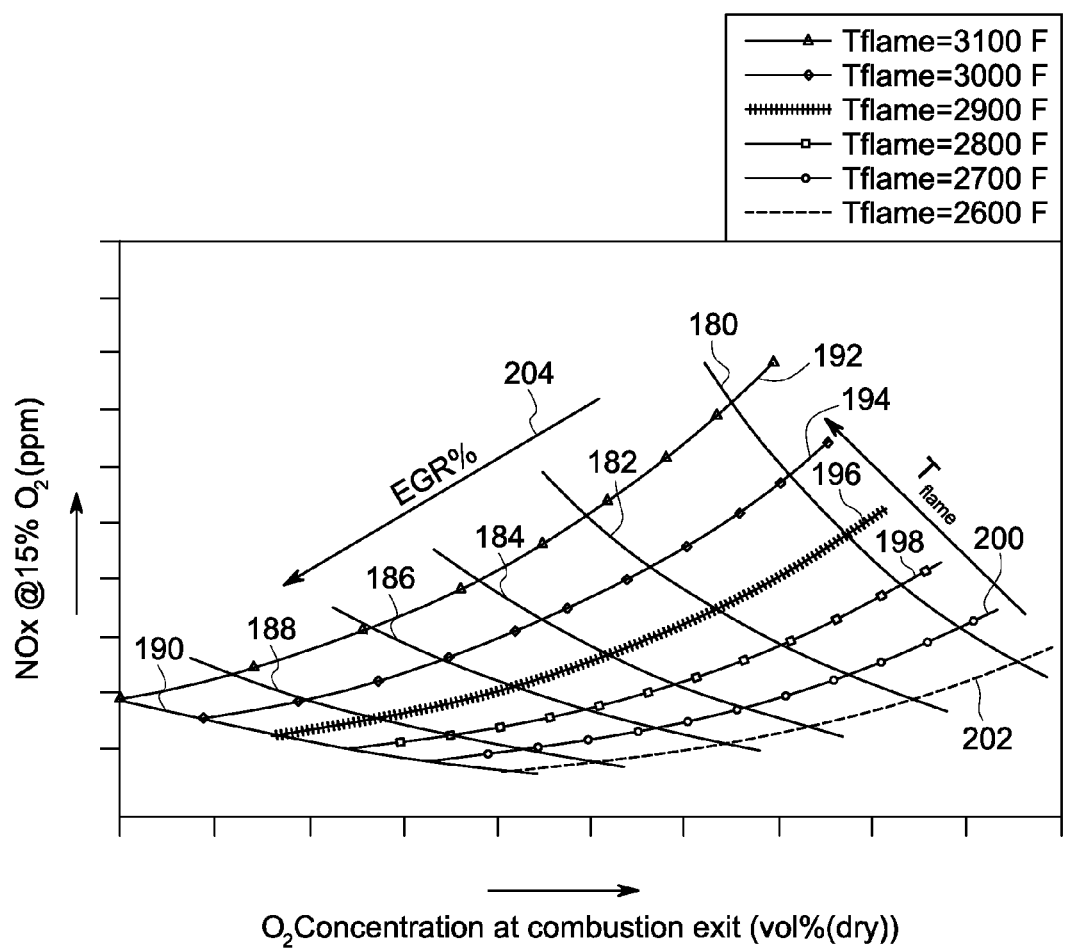
FIG. 7 illustrates a NOx formation trend at different levels of Exhaust gas re-circulation (EGR)

FIG. 7 shows the trends in NOx formation with increases in the exhaust gas recirculation (EGR). The flame temperatures in the combustion chamber 20 goes up from 2600° F. (shown by curve 202) to 3100° F. (shown by curve 192). In between these, curves 194, 196, 198 and 200 represent flame temperatures of 3000° F., 2900° F., 2800° F. and 2700° F. respectively. The concentration of oxygen in the discharge 22 from the combustion chamber increases as the exhaust gas re-circulation decreases along the curves 180, 182, 184, 186, 188 and 190. It is clear from FIG. 7 that at a fixed flame temperature (for example, curve 192 representing 3100° F.) as the EGR goes up (as represented by arrow 204) the NOx formation reduces. Similar observation is illustrated in curves 194, 196, 198, 200 and 202.

Figure 8:
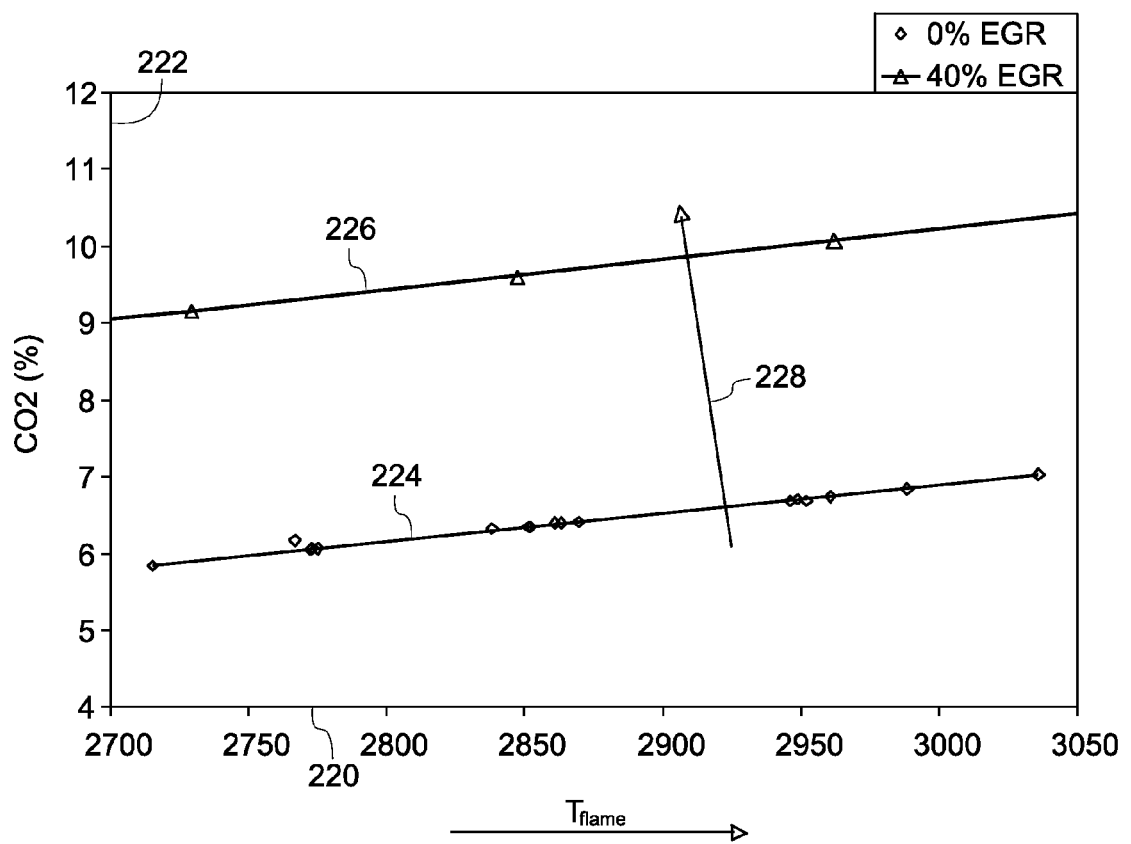
FIG. 8 illustrates $CO_2$ concentration trend at different levels of EGR.

FIG. 8 shows the trends in concentration of carbon dioxide (plotted in axis 222) with varying flame temperature (plotted in axis 220) and EGR. As the EGR increases from 0% (shown by line 224) to 40% (shown by line 226) along the arrow 228, the concentration of $CO_2$ increases as larger portions of exhaust is recycled back into the inlet of the compressor as the recycle stream 52.

The power generation systems described herein includes a retrofittable exhaust gas re-circulation unit that can be implemented as a retrofit for turbines that need to comply with lower levels of NOx formation, as well as allowing more effective $CO_2$ separation, in situations where $CO_2$ separation is required. The retrofittable solution is an option for power generation with exhaust that is $CO_2$-lean and has a lower NOx level than NOX level typically observed in a combustion process. The higher concentration of $CO_2$ in the discharge from the combustion chamber eventually has a significant impact on the separation cost for $CO_2$ before the exhaust is released to atmosphere, saving up to 35% of the cost of the plant. This technique allows the gas turbine to operate normally with combustor inlet oxygen levels of as low as 13% and exit levels of oxygen to about less than 2%, while lowering NOx to levels less than 10 ppm. In some embodiment the NOx level may be lower than 5 ppm without the use of a selective catalytic reduction (SCR) process. The purification unit provided in all the embodiments described herein provides a clean exhaust gas recycle stream, which purification process prevent damage to the internal components to the turbine system by removing undesired species such as particulates, moisture, aldehydes and acid gases. Therefore the turbine system is operationally more reliable. The use of two control valves to control the release of the exhaust adds more flexibility to achieve an optimum performance of the power generation system and also provides a control system to prevent any damage to the internal components of the turbine system in case of any failure in the purification system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
a gas turbine system comprising:
a combustion chamber configured to combust a fuel stream;
a compressor configured to receive a feed oxidant stream and supply a compressed oxidant to the combustion chamber; and
an expander configured to receive a discharge from the combustion chamber and generate an exhaust comprising carbon dioxide; and
a retrofittable exhaust gas recirculation system comprising:
a splitter configured to split the exhaust into a first split stream and a second split stream;
a heat recovery steam generator configured to receive the first split stream and generate a cooled first split stream; and
a purification system configured to receive the first cooled split stream and to directly receive the second split stream and generate a recycle stream, wherein the recycle stream is mixed with the fresh oxidant to generate the feed oxidant stream.

2. The system of claim 1 further comprising a blower to boost pressure in the cooled first split stream.

3. The system of claim 1, wherein the purification system comprises a water quench unit, a de-mister and a heat exchanger.

4. The system of claim 1 further comprising a first control valve and a second control valve wherein the first control valve is configured to release a portion of the cooled first exhaust and the second control valve is configured release a portion of the recycle stream.

5. The system of claim 3, wherein the heat exchanger is one selected from the list consisting of a drier, a condenser, a cooler, an adsorption chiller and a combination thereof.

6. The system of claim 1, wherein the system is configured for recycling up to 50% of the exhaust back to the compressor.

7. The system in claim 1, wherein the splitter comprises a coanda ejector.

8. The system in claim 1, wherein the expander is configured to generate exhaust comprising oxides of nitrogen (NOx) at about 2 ppm to about 14 ppm.

9. The system of claim 1, wherein the compressor is configured to receive the feed oxidant stream comprising one of air or oxygen depleted air.

10. The system of claim 1, wherein the combustion chamber is configured to combust the fuel stream selected from the group consisting of natural gas, methane, methanol, ethanol, ethane, liquid petroleum gas (LPG), naphtha, butane, propane, diesel, kerosene, an aviation fuel, a coal derived fuel, a bio-fuel, gas oil, crude oil, an oxygenated hydrocarbon feedstock, refinery off gas, associated gas and mixtures thereof.

11. A power generation system comprising:
a gas turbine system comprising:
a combustion chamber configured to combust a fuel stream;
a compressor configured to receive a feed oxidant stream and supply a compressed oxidant to the combustion chamber; and
an expander configured to receive a discharge from the combustion chamber and generate an exhaust comprising carbon dioxide;
an exhaust gas recirculation unit comprising;
a splitter configured to split the exhaust into a first split stream and a second split stream;
a heat recovery steam generator configured to receive the first split stream and generate a cooled first split stream;
a blower to boost pressure in the cooled first split stream;
a purification system configured to receive the first cooled split stream and to directly receive the second split stream and generate a recycle stream, wherein the recycle stream is mixed with the fresh oxidant to generate the feed oxidant stream; and
a first control valve and a second control valve wherein the first control valve is configured to release a portion of the cooled first exhaust and the second control valve is configured release a portion of the recycle stream.

12. The system of claim 11, wherein said exhaust gas recirculation unit is retrofittable.

13. The system of claim 11, wherein the purification system comprises a water quench unit, a de-mister and a heat exchanger.

14. The system of claim 13, wherein the heat exchanger is one selected from the list consisting of a drier, a condenser, a cooler, an adsorption chiller and a combination thereof.

15. The system of claim 11, wherein the system is configured for recycling up to 50% of the exhaust back to the compressor.

16. The system in claim 11, wherein the splitter comprises a coanda ejector.

17. The system in claim 11, wherein the expander is configured to generate exhaust comprising oxides of nitrogen (NOx) at about 5 ppm to about 14 ppm.

18. The system of claim 11, wherein the compressor is configured to receive the feed oxidant stream comprising one of air or oxygen depleted air.

19. The system of claim 11, wherein the combustion chamber is configured to combust the fuel stream selected from the group consisting of natural gas, methane, methanol, ethanol, ethane, liquid petroleum gas (LPG), naphtha, butane, propane, diesel, kerosene, an aviation fuel, a coal derived fuel, a bio-fuel, gas oil, crude oil, an oxygenated hydrocarbon feedstock, refinery off gas, associated gas and mixtures thereof.

20. A method of generating power with reduced NOx emission comprising:
- compressing a feed oxidant and generating a compressed oxidant in a compressor;
- combusting a fuel stream and the compressed oxidant in a combustion chamber and generating a discharge;
- expanding the discharge from the combustion chamber and generating an exhaust comprising carbon dioxide;
- splitting the exhaust into a first split stream and a second split stream;
- recovering heat from the first split stream and generating a cooled first split stream;
- increasing the pressure of the cooled first split stream;
- directly remixing the cooled first split stream and the second split stream and generating a mixed exhaust;
- purifying the mixed exhaust and generating a recycle stream; and
- mixing the recycle stream with fresh oxidant and generating the feed oxidant.

21. The method of claim 20 further comprising releasing a portion of the cooled first split stream through a first control valve and releasing a portion of the recycle stream through a second control valve.

22. The method of claim 20, wherein about 50% of the exhaust is recycled back to the compressor.

23. The method in claim 20, wherein the splitting is accomplished in a coanda ejector.

24. The method in claim 20, wherein the exhaust stream comprises oxides of nitrogen (NOx) at about 5 ppm to about 14 ppm.

25. The method of claim 20, wherein the feed oxidant stream comprises one of air or oxygen depleted air.

26. The method of claim 20, wherein the fuel is selected from the group consisting of natural gas, methane, methanol, ethanol, ethane, liquid petroleum gas (LPG), naphtha, butane, propane, diesel, kerosene, an aviation fuel, a coal derived fuel, a bio-fuel, gas oil, crude oil, an oxygenated hydrocarbon feedstock, refinery off gas, associated gas and mixtures thereof.

27. A method of generating power comprising:
- compressing a feed oxidant and generating a compressed oxidant in a compressor;
- combusting a fuel stream and the compressed oxidant in a combustion chamber and generating a discharge;
- expanding the discharge from the combustion chamber and generating an exhaust comprising carbon dioxide;
  - splitting the exhaust into a first split stream and a second split stream using a coanda ejector;
  - recovering heat from the first split stream and generating a cooled first split stream;
  - increasing the pressure of the cooled first split stream;
  - directly remixing the cooled first split stream and the second split stream and generating a mixed exhaust;
  - purifying the mixed exhaust and generating a recycle stream;
  - mixing the recycle stream with fresh oxidant and generating the feed oxidant; and
  - releasing a portion of the cooled first exhaust through a first control valve and releasing a portion of the recycle stream through a second control valve.

* * * * *